(No Model.) 2 Sheets—Sheet 2.
E. B. & G. E. B. WELLES.
EXTENSIBLE PEDAL LEVER FOR BICYCLES.
No. 594,047. Patented Nov. 23, 1897.
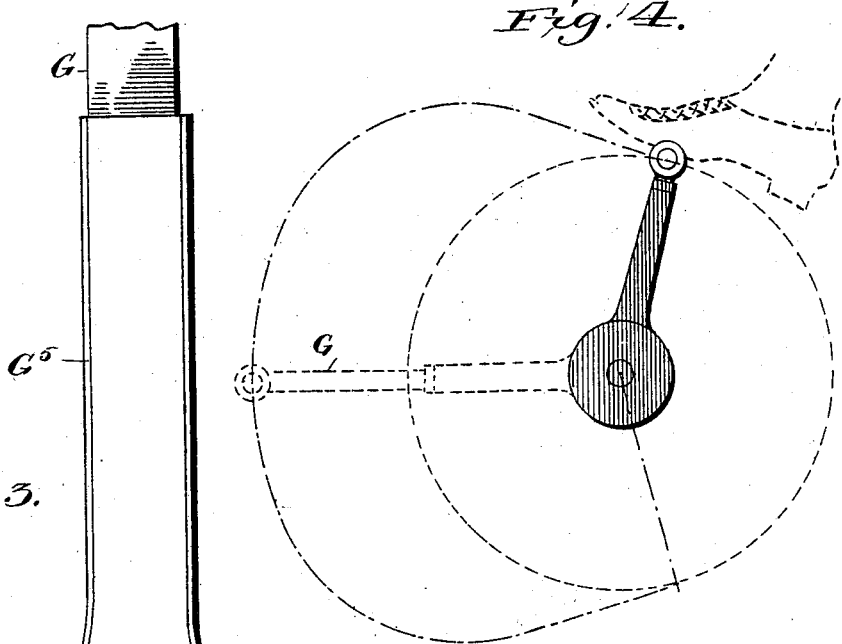

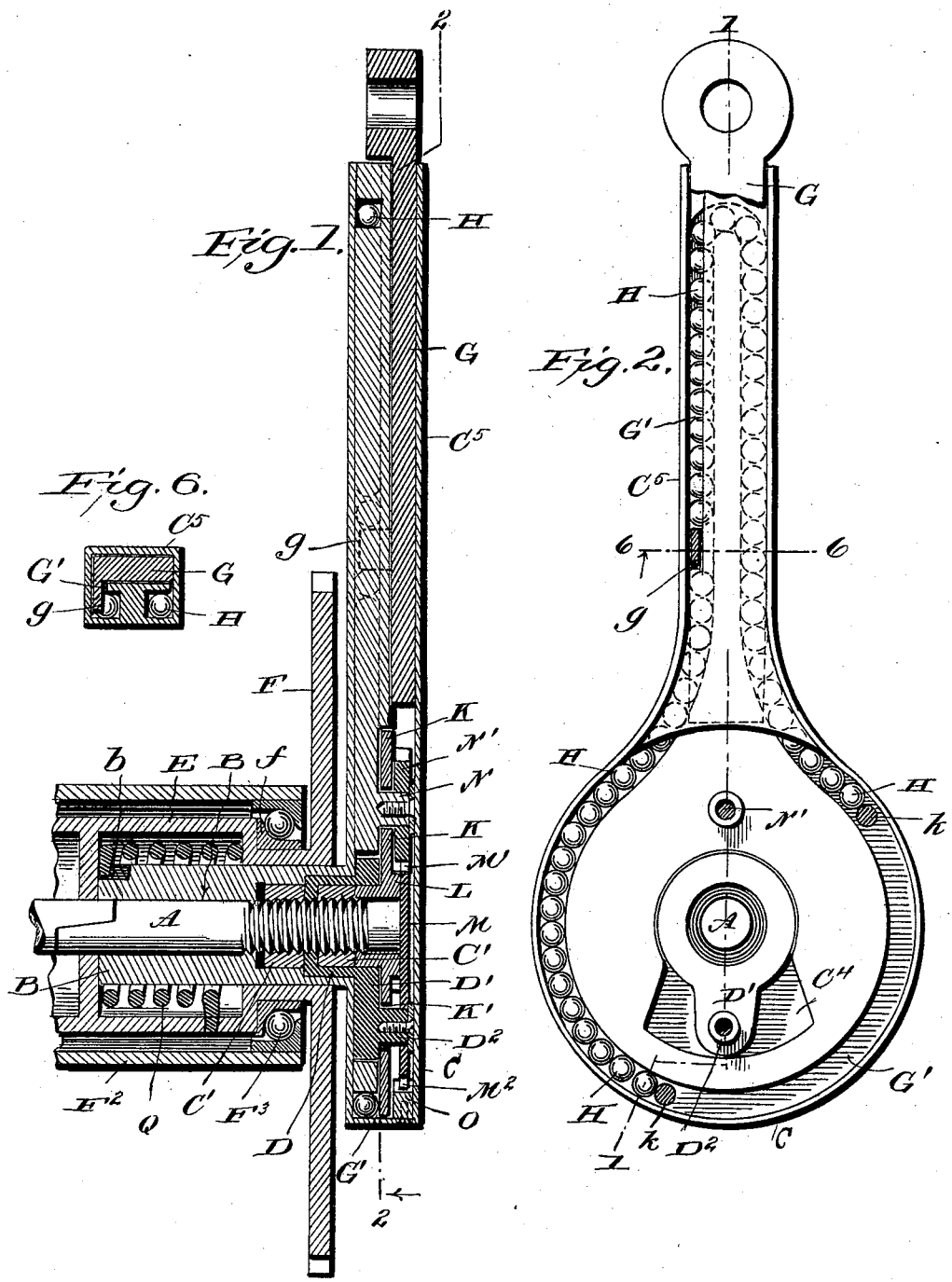

UNITED STATES PATENT OFFICE.

EDWARD BENTON WELLES AND GEORGE EDWARD BENTON WELLES, OF ASHEVILLE, NORTH CAROLINA.

EXTENSIBLE PEDAL-LEVER FOR BICYCLES.

SPECIFICATION forming part of Letters Patent No. 594,047, dated November 23, 1897.

Application filed November 25, 1896. Serial No. 613,420. (No model.)

*To all whom it may concern:*

Be it known that we, EDWARD BENTON WELLES and GEORGE EDWARD BENTON WELLES, citizens of the United States, residing at Asheville, in the county of Buncombe and State of North Carolina, have invented certain new and useful Improvements in Extensible Pedal-Levers for Bicycles; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in bicycle propulsion, and especially to a variable-speed gear, whereby the pedals may be automatically extended for use in hill climbing or in propelling the machine over heavy roads by the rider's feet. As he presses down the traction becomes greater. The pedal is distended until it reaches its lowest dead-center, after which the pedal will be closed on the upward throw, ready for the next downward stroke.

A further part of the invention resides in an extensible pedal which is carried in a suitable casing on a crank-shaft and which is adapted to be extended by a series of ball-bearings which bear against lugs on a wheel and a lug on the extensible pedal-carrying lever, which balls are designed to force the pedal-lever out and close the same as the said wheel is caused to rotate back and forth by means which will be hereinafter more fully described, and illustrated in the accompanying drawings.

To these ends and to such others as the invention may pertain the same consists, further, in the novel construction, combination, and adaptation of parts, as will be hereinafter more fully described, and then specifically defined in the appended claims.

Our invention is clearly illustrated in the accompanying drawings, which, with the letters of reference marked thereon, indicate like parts throughout the several views, in which—

Figure 1 is a vertical sectional view through the crank-shaft, the hub, sprocket-wheel, and extensible pedal-lever. Fig. 2 is a side elevation of the casing carrying the extensible pedal-lever, with parts broken away and parts removed to better illustrate the interior mechanism, taken on line 2 2 of Fig. 1. Fig. 3 is a side elevation of the casing carrying the pedal extension-lever with the parts in place, showing the relative arrangement of the segment and gear-wheels therein. Fig. 4 is a diagrammatic view showing in dotted lines the path which the pedal follows while the same is distended and also when held in a normal position. Fig. 5 is a detail view of the disk which carries lugs. Fig. 6 is a sectional view on line 6 6 of Fig. 2.

Reference being had to the details of the drawings by letter, A designates the crank-shaft, having mounted thereon a cylinder B, secured to or integral with a casing C, which cylinder is slotted at $b$, and to the end of this cylinder is securely attached the thimble D, which is provided with an arm D', carrying near the end thereof the lug $D^2$. This thimble D is held on the threaded end of the crank-shaft by means of the nuts C', which are screwed onto the shaft and the inner nut bearing against a shoulder on the inner wall of the said cylinder.

E is an outer cylinder, which carries the sprocket-wheel F and supports the bearing member $f$.

$F^2$ is the crank-hanger, which is provided with a concaved bearing member, between which and the bearing member on the said cylinder E are adapted to rest the ball-bearings $F^3$. The inner face of the said casing is recessed, as shown at $C^4$, and in this recess the arm D of the thimble is allowed a slight lateral play, thus allowing a partial rotary motion of the shaft independent of the casing carried thereon. Slidingly held in the arm $C^5$ of the casing is the extensible pedal-lever G, which has a lug $g$ extending into a recessed portion G' beneath the same. This recessed portion extends about the inner periphery of the casing C and nearly the length of the arm of the casing on either side thereof, forming a continuous path in which is designed to be carried a series of antifriction-balls H. Mounted on the outer end of the said crank-shaft is the loosely-journaled disk K, which has the curved apertures K' therein and on its under side the lugs k, which are extended down into the said recessed portion G'. These lugs k serve as stops, and the antifriction-balls are inserted in the recess G', extending from one lug on the said disk substantially the length of the arm and around on the opposite side down to the opposite lug, filling the entire recess from lug to lug, whereby it will be seen that as the said disk is caused to be rocked back and forth the line of balls bearing against the lug on the extensible pedal-lever will cause the latter to be thrown out or in, as the case may be, these balls forming a function of a flexible shaft, forcing the pedal out and in. Integral with the outer face of the said disk is the geared wheel L, and journaled on the lug D² on the arm D' of the thimble is the segment M, having a series of teeth M' about its outer edge and a semicircular row of teeth M² on its inner edge. Journaled on a post N is the geared wheel N', which is adapted to gear with the teeth on the segment M and also with the teeth of the integral geared wheel L, which teeth are disposed so as to register with one another. Secured to the inner rim of the casing is the curved rack-bar O, having teeth which are designed to mesh with the semicircular series of teeth on the segment M. Suitable retaining members P are secured at any desired location about the inner periphery of the said casing, which are provided to hold the disk in place on the crank-shaft. The crank-shaft, which is threaded at each end, is adapted to carry both of the pedal-cranks and holds the same in place by means of the jam-nuts described. Located about the circumference of the inner cylinder B is the coiled spring Q, which has one of its ends secured in a slot in the said cylinder, its other end being adjustably held to a lug on the inner periphery of the cylinder E.

The operation of the extensible pedal is as follows: As it will be noted that the coiled spring has one end secured to the inner cylinder B (which cylinder carries the casing) and its other end to the outer cylinder, it is intended that the cylinder B will be caused to move with the outer cylinder, through the medium of the coiled spring interposed between the same, on a light draft, as where the machine is being propelled on a level road; but when a hill is being ascended or a heavy track encountered the force which the rider exerts on the pedal in its downward tread, which force is in excess of that exerted while propelling the machine on the level, is such as to tighten the spring slightly, which is accompanied by the cylinder-carrying casing making a partial revolution, which is allowed by the arm of the thimble working laterally in the recess in the disk located in the casing. As the casing makes a partial revolution before it takes hold of the crank-shaft to revolve the same a slight rotation is caused to the geared segment, and the teeth on the outer edge of the segment will cause the gearwheel N' to make a partial revolution, the teeth of which geared wheel mesh with the teeth of the integral geared wheel secured to the disk and cause the latter to make a partial revolution, and as the said disk makes its partial revolution it will be seen that the series of antifriction-balls which bear against the lugs on the disk and the lugs on the extensible pedal-crank lever will cause the lever to be thrown out in the position illustrated in the diagrammatic view in the drawings, thus giving a longer leverage for the pedaling in the downward tread. As the foot passes the lowest limit at which force is applied to the propelling of the pedal and the pressure is lifted from the pedal the recoil of the spring, which has been tightened in the downward tread of the pedal, will cause the casing to regain its normal position, making the partial revolution on the shaft, and the movement of the said disk is reversed and a reverse movement imparted to the antifriction-balls on the opposite side of the lug on the pedal-crank lever, which causes the latter to be forced back within the arm of the casing, ready for the next downward tread of the pedal.

While in the drawings we have illustrated but one pedal casing and mechanism, it is our purpose to provide two casings similarly constructed carried within the crank-hanger.

Having thus described our invention, what we claim to be new, and desire to secure by Letters Patent, is—

1. A bicycle attachment, comprising a shaft, a crank-casing, an extensible pedal-carrying lever carried therein, a rocking disk and a series of antifriction-balls adapted to bear between projections on said disk and lever, a coiled spring, having one end secured to the cylindrical portion of the casing carried on the crank-shaft, a sprocket-carrying cylinder, to which the other end of the spring is connected, and geared connection between the axle-shaft and mechanism carried in the casing, whereby the pedal-carrying lever when extended may be withdrawn into the casing, substantially as shown and described.

2. An extensible pedal-carrying lever for bicycles, comprising in combination with the crank-shaft, a cylinder, mounted thereon, a casing secured thereto, an extensible pedal-lever provided with a lug carried in the said casing, a sprocket-wheel-carrying cylinder, mounted over the inner cylinder, a disk within the casing, having lugs on its under face, a series of antifriction-balls adapted to bear between the lugs on the said disk and extensible pedal-carrying lever, a spring connecting the sprocket-carrying cylinder with the casing, and a geared connection between the pedal-shafts and the mechanism carried within the casing, whereby the extensible pedal-carrying lever may be extended or drawn within its casing, substantially as set forth.

3. An extensible pedal for a bicycle, consisting of the main crank-shaft threaded at its ends combined with a cylinder B mounted thereon, and carrying a casing, a thimble D carried on said shaft, and resting on an annular shoulder of the cylinder; jam-nuts on the shaft on either side of the thimble, an arm D' on the thimble, carrying a lug D², the disk K, mounted on the end of the shaft, and having a recess in which the said lug D² and arm D' have a lateral play, an extensible pedal-carrying lever, a series of antifriction-balls adapted to bear between lugs on the said disk, and a lug on the extensible pedal-carrying lever, whereby the said lever may be extended, and means for closing the lever in its casing, substantially as described.

4. In an extensible pedal-carrying lever for a bicycle, the combination with the crank-shaft, cylinder B and casing mounted thereon, the sprocket-wheel-carrying cylinder and coil-spring C, having an end connected to each, of the thimble D mounted on the crank-shaft and in the said casing, and carrying a lug, of the disk K, and means connected with the said thimble-lug for rocking the same; lugs on the under surface of the said disk, adapted to travel in the recess of the crank extension of the casing, a pedal-carrying lever carried therein, a lug on said lever, which extends in a recess continuous with the line in which the lugs of the disk extend, of a continuous series of antifriction-balls in said recess, bearing against the lugs on the disk, and lever, and means for throwing the lever in and out as a variable pressure is brought to bear against the pedal, substantially as described.

5. In an extensible pedal-lever, the combination with the crank-shaft, cylinder, spring connecting same and thimble provided with an arm carrying a lug D², of the casing, the disk mounted therein on the said crank-shaft, the segment M, mounted on the lug D², which has a lateral play in a recess in the inner face of the casing, of a rack-bar secured to the inner periphery of the casing, the integral geared wheel on the disk and geared wheel secured to the casing, which wheel is designed to mesh with teeth on the segment and on the integral geared wheel, of the pedal-carrying lever, a lug thereon traveling in a recess in the casing, lugs on the disk, and balls bearing between the said lugs on lever and disk, substantially as described.

In testimony whereof we affix our signatures in presence of two witnesses.

EDWARD BENTON WELLES.
GEORGE EDWARD BENTON WELLES.

Witnesses:
LUCIUS J. BOWEN,
ROB. D. MOONEY.